UNITED STATES PATENT OFFICE.

JOHN H. NIELD, OF HACKENSACK, NEW JERSEY, ASSIGNOR TO GENERAL CHEMICAL COMPANY, OF NEW YORK, N. Y., A CORPORATION OF NEW YORK.

PROCESS OF PRODUCING HYDROCHLORIC ACID.

1,102,539.  Specification of Letters Patent.  Patented July 7, 1914.

No Drawing.  Application filed August 21, 1909. Serial No. 514,629.

*To all whom it may concern:*

Be it known that I, JOHN HERBERT NIELD, a citizen of the United States, and resident of Hackensack, county of Bergen, and State of New Jersey, have invented certain new and useful Improvements in Processes of Producing Hydrochloric Acid, of which the following is a specification.

The object of this invention is to provide a process for the production of hydrochloric acid by the action of sulfuric acid upon sodium chlorid, hereinafter termed "common salt," in such a manner that a fluid or semi-fluid intermediate condition or state of the materials does not occur and which therefore can be practised commercially in a continuous manner.

In the heretofore successful commercial process for the manufacture of hydrochloric acid by the action of sulfuric acid upon common salt, the operations are conducted in two stages and are therefore intermittent or discontinuous and this intermittent nature of these processes has manufacturing disadvantages which it is the purpose of this invention to minimize or remove.

Now I have discovered that if common salt is suitably mixed with a suitable amount of a suitable inert material such as salt cake, it can be acted upon by the requisite amount of sulfuric acid to convert substantially the entire amount of common salt into hydrochloric acid without a liquid or semi-liquid state intervening and that from start to finish the mixture remains sufficiently firm and hard so that it may be propelled or moved over a suitably heated surface by means of devices such as rakes, moved by machinery or by hand (preferably the former); by moving the material from the cooler to the hotter and finally to the hottest portions of the heated surface it is possible continuously to treat common salt with sulfuric acid so as to evolve continuously hydrochloric acid and to the full extent usually obtained commercially.

The process I have invented and based upon the discovery has, as compared with the commercial process heretofore used for this purpose, the following advantages: 1. A graded and controllable application of heat to the mixed materials. 2. Small losses of sulfuric acid due to local overheating of the charge. 3. Less sulfuric acid in the hydrochloric acid product. 4. Smaller losses of unacted-on common salt or sulfuric acid in the solid residue. 5. Less time is required for the commercially complete decomposition of a charge of materials. 6. Continuous evolution of hydrochloric acid gas in a high degree of concentration. 7. A substantially constant regular amount of work put upon the absorption apparatus of the plant, combined with higher efficiency and more easily controlled operation of this absorption plant. 8. Less manual labor, since the process can be carried out in a suitable mechanically operated furnace. 9. Less hardship upon the laborers and the surrounding vegetation and habitations, due to escape of hydrochloric acid gas from the decomposing apparatus.

I now proceed to illustrate my invention by the following example, but in so doing I am to be understood as not being limited to the precise conditions therein set forth.

I have found that a satisfactory mixture can be obtained as follows: Common salt 50 parts, salt cake 50 parts, are separately ground, then thoroughly mixed and finally passed through a 20 mesh screen and the product mixed with its equivalent weight of sulfuric acid containing $93\frac{1}{2}\%$ $H_2SO_4$. The mixture when produced, is placed upon a heated surface, for example the bottom of a muffle heated at its hottest part to about 1000° F. and gradually moved over the muffle bed by means of rakes propelled by hand or machinery from the cooler portion to the hottest portions of the muffle; at the end of about one hour the decomposition will be found to be commercially complete.

While my process may be carried out in various types of apparatus, I preferably employ an apparatus such as described and claimed in my U. S. Patent No. 1,033,825, dated July 30, 1912.

The above described apparatus constitutes the subject matter of a separate application for patent filed August 6, 1909, Ser. No. 511,510.

I claim:

1. The process of making hydrochloric acid which comprises treating with sulfuric acid, a mixture of common salt and a pulverulent, substantially inert material; the latter being in amount sufficient to prevent any substantial amount of liquefaction of the reacting materials at any stage of the process.

2. The process of making hydrochloric acid which comprises causing liquid sulfuric acid to act upon common salt in the presence of an amount of salt cake sufficient to substantially prevent fusion of the mass at any stage of the process.

3. The process of making hydrochloric acid which comprises causing sulfuric acid to act at successively increasing temperatures, upon a mixture of substantially equal parts of common salt and salt cake, until the conversion of the common salt and sulfuric acid into normal sodium sulfate and hydrochloric acid is substantially complete and while substantially avoiding liquefaction of the mass at any stage of the process.

4. The improvement in the art of manufacturing hydrochloric acid from common salt and sulfuric acid which consists in heating to the requisite temperature a mixture of such substances and a neutral substance, thus permitting substantially all of the sulfuric acid and of the common salt to react with each other, to form salt cake and hydrochloric acid, and thereby avoiding the formation of a pasty mass and the consequent stoppage of the operation, substantially as and for the purpose described.

5. The improvement in the art of manufacturing hydrochloric acid from common salt and sulfuric acid which consists in heating to the requisite temperature a mixture of such substances and salt cake, thus permitting substantially all of the sulfuric acid and of the common salt to react with each other, to form salt cake and hydrochloric acid, and thereby avoiding the formation of a pasty mass and the consequent stoppage of the operation, substantially as and for the purpose described.

6. The process of making hydrochloric acid, which comprises progressively heating, to a temperature at which the reaction between common salt and sulfuric acid is substantially complete, a mixture of sulfuric acid and common salt, while containing a sufficient amount of an inert solid material, to prevent the formation of a liquid or pasty mass, while progressively moving said mass into locations having progressively increasing temperatures.

7. The process of making hydrochloric acid, which comprises progressively heating to a temperature at which the reaction between common salt and sulfuric acid is substantially complete, a mixture of sulfuric acid and common salt, while containing a sufficient amount of salt cake to prevent the formation of a liquid or pasty mass, while progressively moving said mass into locations having progressively increasing temperatures.

8. The process of making hydrochloric acid, which comprises progressively heating to an ultimate temperature of about 1000° F., a mixture of sulfuric acid and common salt, while containing a sufficient amount of an inert solid material to prevent the formation of a liquid or pasty mass, while progressively moving said mass into locations having progressively increasing temperatures.

In testimony whereof I have hereunto set my hand in the presence of two subscribing witnesses.

J. H. NIELD.

Witnesses:
 BERNHARD C. HESSE,
 FRITZ. V. BRIESEN.